United States Patent
Seo et al.

(10) Patent No.: US 10,620,343 B2
(45) Date of Patent: Apr. 14, 2020

(54) METAMATERIAL FOR ELECTROMAGNETIC WAVE FILTER

(71) Applicant: KOREA INSTITUTE OF SCIENCE AND TECHNOLOGY, Seoul (KR)

(72) Inventors: Minah Seo, Seoul (KR); Sanghun Lee, Seoul (KR); Deokha Woo, Seoul (KR); Jaehun Kim, Seoul (KR); Taikjin Lee, Seoul (KR); Jaebin Choi, Seoul (KR); Chulki Kim, Seoul (KR); Joo-Hiuk Son, Seoul (KR); Young Min Jhon, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 222 days.

(21) Appl. No.: 15/808,066

(22) Filed: Nov. 9, 2017

(65) Prior Publication Data

US 2018/0180771 A1 Jun. 28, 2018

(30) Foreign Application Priority Data

Dec. 28, 2016 (KR) ........................ 10-2016-0181122

(51) Int. Cl.
*G02B 26/00* (2006.01)
*G02B 1/00* (2006.01)
(Continued)

(52) U.S. Cl.
CPC .............. *G02B 1/002* (2013.01); *G02B 5/20* (2013.01); *G02B 27/28* (2013.01); *H01Q 15/0086* (2013.01)

(58) Field of Classification Search
CPC .................................................... G02B 1/002
(Continued)

(56) References Cited

U.S. PATENT DOCUMENTS

| 8,710,444 B2 | 4/2014 | Kim et al. |
| 2015/0255877 A1* | 9/2015 | Liu .................... H01Q 15/0006 343/909 |
| 2016/0079811 A1* | 3/2016 | Seo .......................... H01P 7/08 307/104 |

FOREIGN PATENT DOCUMENTS

| CN | 106019648 A | 10/2016 |
| KR | 10-2001-0092940 A | 10/2001 |

(Continued)

OTHER PUBLICATIONS

Jeffrey R. DiMaio et al., "Polarization-dependent transmission through subwavelength anisotropic aperture arrays", Optics Express, Mar. 20, 2006, pp. 2380-2384, vol. 14, No. 6.

(Continued)

*Primary Examiner* — James C. Jones
(74) *Attorney, Agent, or Firm* — Rabin & Berdo, P.C.

(57) ABSTRACT

A metamaterial for an electromagnetic wave filter includes a substrate; and a film disposed on the substrate and having a set of slots arranged to form a rotationally symmetric pattern, which is patterned in an intaglio shape, or a set of structures arranged to form a rotationally symmetric pattern, which is patterned in an embossed shape, to control a transmission rate according to polarization of an electromagnetic wave incident on the film. The set of slots or the set of structures have an array angle that is determined such that the transmission rate and a reflectivity thereof have constant values according to the polarization of the electromagnetic wave incident on the film, and have a chloroplast molecular structure pattern in which the set of slots or the set of structures are arranged in pentagonal and hexagonal shapes.

4 Claims, 6 Drawing Sheets

(51) Int. Cl.
  *G02B 5/20* (2006.01)
  *G02B 27/28* (2006.01)
  *H01Q 15/00* (2006.01)
(58) Field of Classification Search
  USPC .......................................................... 359/238
  See application file for complete search history.

(56) References Cited

FOREIGN PATENT DOCUMENTS

| KR | 10-2011-0023618 A | 3/2011 |
| KR | 10-2013-0040041 A | 4/2013 |
| KR | 10-1401769 B1 | 5/2014 |

OTHER PUBLICATIONS

Korean Office Action dated Jan. 17, 2018.
Shufeng Zheng, "Research on miniaturization design and optimization of frequency selective surface", <China Doctoral Dissertations Full-text Database>, Mar. 15, 2013.
Chinese Office Action dated Jan. 6, 2020.

* cited by examiner

METAMATERIAL FOR ELECTROMAGNETIC WAVE FILTER

CROSS-REFERENCE TO RELATED APPLICATION

This application claims priority to and the benefit of Korean Patent Application No. 2016-0181122, filed on Dec. 28, 2016, the disclosure of which is incorporated herein by reference in its entirety.

BACKGROUND

1. Field of the Invention

The present invention relates to a metamaterial, and more particularly, to a metamaterial which is an element of an electromagnetic wave filter and is not affected by a polarization state of an incident electromagnetic wave.

2. Discussion of Related Art

Figure 1:
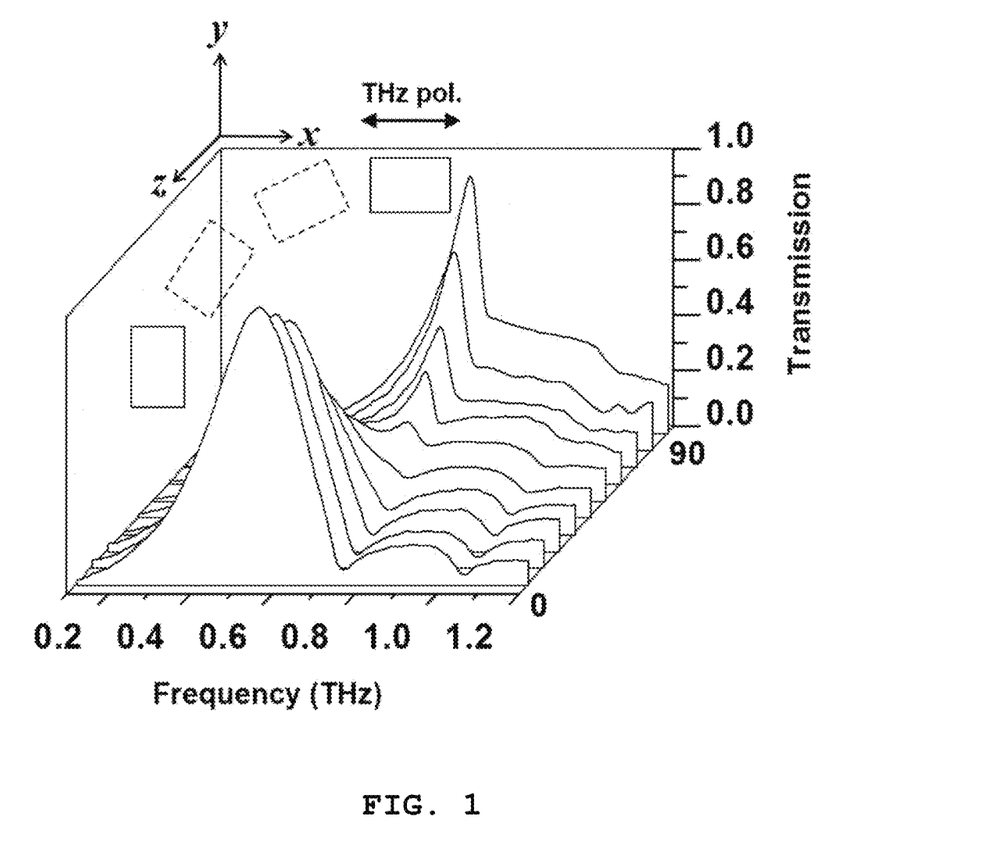
FIG. 1 is a graph showing a change in a transmission spectrum of an electromagnetic wave according to rotation of a metamaterial arranged in a single direction.

Generally, an electromagnetic wave filter uses a metamaterial including slots arranged in a single direction to maximize transmission and reflection efficiency. However, in such a structure of a metamaterial, transmission efficiency of an electromagnetic wave sharply decreases according to polarization of an electromagnetic wave incident on the metamaterial and a rotation angle of the metamaterial, that is, a rotation angle of slots arranged in a single direction according to Malus' law. Referring to FIG. 1, which is a graph showing a frequency of an electromagnetic wave on an x-axis, transmission efficiency of the electromagnetic wave on a y-axis, and a rotation angle of a slot included in a metamaterial on a z-axis, it may be seen that transmission efficiency of an electromagnetic wave filter based on the metamaterial including slots arranged in the single direction varies according to the rotation angle of the slots every 180°.

An amplification effect of an strong electromagnetic wave and application such as sensing a trace amount of substance through the amplification effect can be expected from a metamaterial having a slot structure disclosed in U.S. Pat. No. 8,710,444, however, since transmission efficiency also varies greatly according to a rotation angle of the metamaterial and incident polarization of an electromagnetic wave in such a structure, there is still a problem in that an error occurs when a transmission rate of a sample is measured by a sensor using the metamaterial.

That is, in a condition in which a precise measurement such as detection of a trace amount of material is required, an error may occur due to an arrangement of the metamaterial and an experimental environment, and thus attention thereon is required, and difficulty in distinguishing a change in reaction efficiency of such an electromagnetic wave from a change in an optical characteristic generated by a detection target material may be a fatal weak point when detecting and precisely measuring a highly sensitive molecule. Accordingly, a metamaterial in which a change in a transmission characteristic of an electromagnetic wave due to an arrangement and rotation does not occur is required to solve such a problem.

PRIOR ART DOCUMENT

Patent Document (Patent Document 1) U.S. Pat. Registration No. 8,710,444

Non-Patent Document (Non-Patent Document 1) Polarization-dependent Transmission Through Subwavelength Anisotropic Aperture Arrays, Jeffrey R. DiMaio and John Ballato, Optics Express, vol. Apr. 14, 2006

SUMMARY OF THE INVENTION

The present invention is directed to providing a metamaterial having a structure configured to suppress a change in transmission and reflection efficiencies according to a change in a polarization direction of an electromagnetic wave for an electromagnetic wave filter which is not affected by polarization of an incident electromagnetic wave and a rotation angle of the metamaterial.

A first aspect of the present invention provides a metamaterial for an electromagnetic wave filter, the metamaterial comprising: a substrate; and a film disposed on the substrate, wherein the film is formed such that a set of slots arranged to form a rotationally symmetric pattern is patterned in an intaglio shape or a set of structures arranged to form a rotationally symmetric pattern is embossed and patterned to control a transmission rate according to polarization of an electromagnetic wave incident on the film.

Preferably, an array angle of the slots or the structures may be determined such that the transmission rate and a reflectivity thereof based on the polarization of the electromagnetic wave incident on the film have constant values.

Preferably, the slots or the structures may form a honeycomb structure pattern in which the slots or the structures are arranged at 0°, 120°, and 240° with respect to a vertical direction.

Preferably, the slots or structures may form a chloroplast molecular structure pattern in which the slots or structures are arranged in pentagonal and hexagonal shapes.

Preferably, the substrate may be formed of quartz, silicon, sapphire, or glass.

Preferably, the film may be formed of gold, silver, copper, or aluminum.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving the same should be clearly understood with reference to the accompanying drawings and the following detailed embodiments. However, the present invention is not limited to the embodiments to be disclosed and may be implemented in various different forms. The embodiments are provided in order to fully explain the present invention and fully explain the scope of the present invention for those skilled in the art. The scope of the present invention is defined by the appended claims. Like reference numerals denote like elements throughout the specification. "And/or" refers to all combinations including one or one or more of mentioned items.

Although the terms first, second, etc. may be used herein in reference to various elements, components, and/or sections, such elements, components, and/or sections are not to be construed as limited by these terms. These terms are only used to distinguish one element, component, and/or section from another. Accordingly, a first element, a first component, or a first section mentioned below may also be a second element, a second component, or a second section according to the spirit of the present invention.

The terms used herein are provided to only describe embodiments of the present invention and not for the purpose of limitation. Unless the context clearly indicates otherwise, singular forms include plural forms. It should be understood that the terms "comprise" and "comprising," when used herein, specify the stated components, steps, operations, and/or elements, but do not preclude the presence or addition of one or more other components, steps, operations, and/or elements.

Unless otherwise defined, all terms (including technical and scientific terms) used herein can be used as is customary in the art to which this invention belongs. Also, it should be further understood that terms, such as those defined in commonly used dictionaries, are not to be interpreted in an idealized or overly formal sense unless expressly so defined herein.

When it is determined that detailed descriptions of known technology related to the present invention unnecessarily obscure the subject matter of the invention in the description of embodiment of the invention, the detailed descriptions thereof will be omitted. Some terms described below are defined in consideration of functions in the invention, and meanings thereof may vary depending on, for example, a user or operator's intentions or customs. Therefore, the meanings of terms should be interpreted on the basis of the scope throughout this specification.

FIG. 2 is a cross-sectional view illustrating a metamaterial according to one embodiment of the present invention.

Figure 2A:
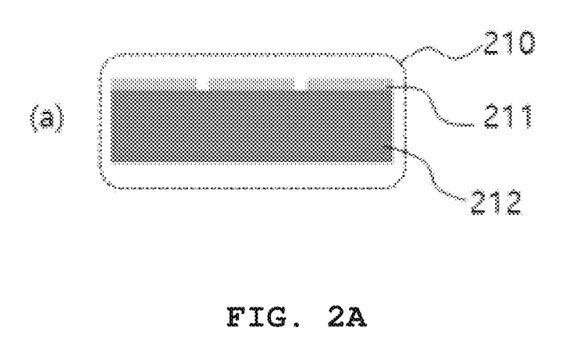
FIGS. 2a and 2b are a cross-sectional view illustrating a metamaterial according to one embodiment of the present invention.

Referring to FIG. 2A, a metamaterial 210 corresponding to an element of an electromagnetic wave filter includes a film 211 and a substrate 212. Here, the metamaterial 210 is a structure in which the film 211 including intaglio-shaped slots is formed on the substrate 212.

Preferably, the film 211 including a set of the slots arranged to form a rotationally symmetric pattern and patterned in an intaglio shape is disposed on the substrate 212, and the film 211 may be formed of gold, silver, copper, or aluminum. Preferably, the substrate 212 may be formed of quartz, silicon, sapphire, or glass.

Figure 2B:
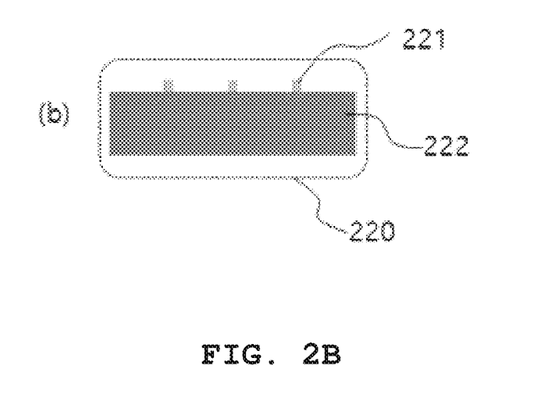

Alternatively, referring to FIG. 2B, a metamaterial 220 corresponding to an element of an electromagnetic wave filter may also include a film 221 and a substrate 222, and may also have a structure in which the film 221 including only embossed structures is formed on the substrate 222.

Preferably, the film 221, which includes a set of the structures embossed, patterned, and arranged to form a rotationally symmetric pattern, is disposed on the substrate 222, and the film 221 may be formed of gold, silver, copper, or aluminum. Preferably, the substrate 222 may be formed of quartz, silicon, sapphire, or glass.

Hereinafter, the metamaterials 210 and 220 for an electromagnetic wave filter will be described in more detail with reference to FIGS. 3 and 4.

The present invention relates to a metamaterial corresponding to an element of an electromagnetic wave filter, and the metamaterial according to the present invention allows an incident electromagnetic wave to be transmitted in a predetermined level without being affected by a polarization direction of the incident electromagnetic wave and is characterized by an array of slots or structures included in the metamaterial.

That is, while a transmission rate of a metamaterial including slots arranged in a single direction sharply decreases according to a rotation angle and a polarization direction of an incident electromagnetic wave on the basis of Malus' law, the transmission rate of the metamaterial according to the present invention including the slots or structures arranged in a specific rotationally symmetric pattern may be maintained without being affected by a rotation angle and a polarization direction of an incident electromagnetic wave.

In addition, various optical applications of such a metamaterial may be realized by utilizing an amplification phenomenon of an electromagnetic wave locally occurring on a surface of slots or structures, and through this, various elements may be developed. Specifically, the metamaterial according to the present invention may be used to an optical modulator utilizing a metal-insulator transition phenomenon of vanadium oxide ($VO_2$) induced by an electromagnetic wave, may be used to boost a nonlinear optical process based on an increase in light intensity, and may be used to implement a high sensitivity and high selectivity sensor element to detect a trace amount of substances by increasing an absorption cross section and optimizing the metamaterial according to a target material.

The metamaterials 210 and 220 of the present invention may be formed such that the films 211 and 222 including sets of rectangular slots and structures forming specific patterns embossed and patterned in an intaglio shape are disposed on the substrates 212 and 221, and hereinafter, a set of slots in a specific rotationally symmetric pattern formed in the film 211 will be mainly described. Here, in a case in which the film 221 including a set of structures formed in a specific pattern is disposed on the substrate 222, the same description of the following slots may be applied to the case.

Figure 3:
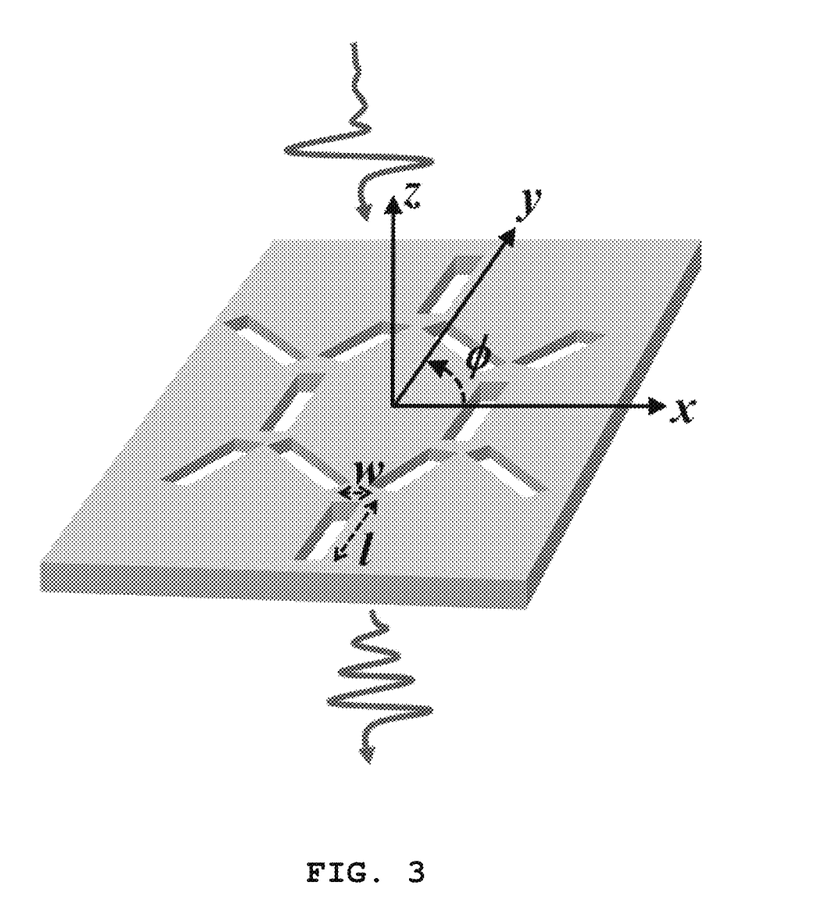
FIG. 3 is a view illustrating a pattern patterned on a metamaterial for an electromagnetic wave filter according to one embodiment of the present invention.
Figure 4:
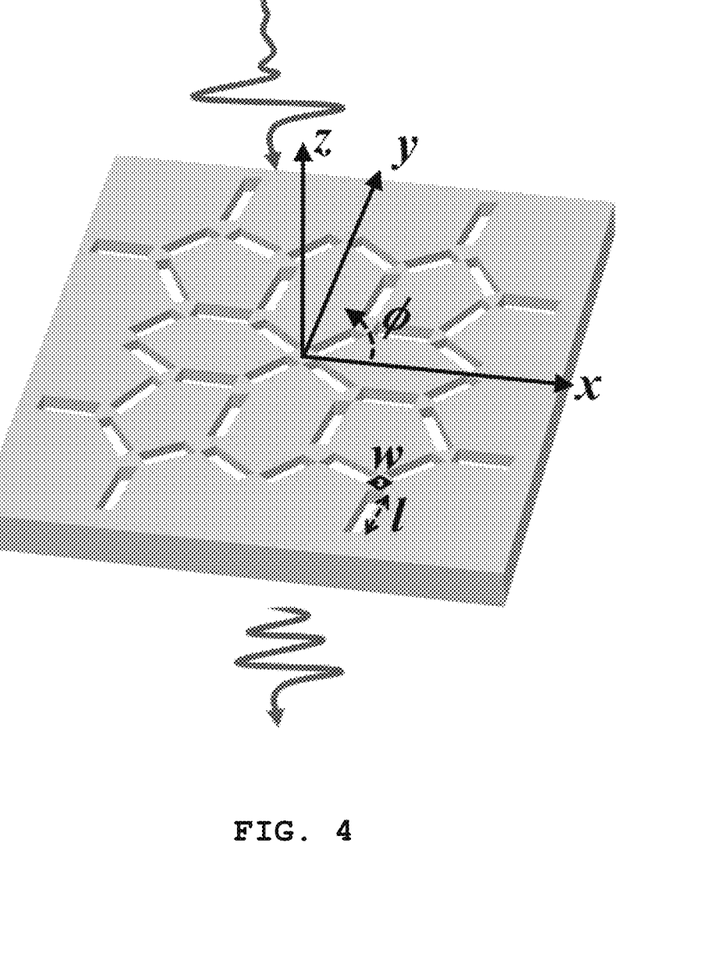
FIG. 4 is a view illustrating a pattern patterned on a metamaterial for an electromagnetic wave filter according to another embodiment of the present invention.

FIG. 3 is a view illustrating a pattern patterned on a metamaterial for an electromagnetic wave filter according to one embodiment of the present invention, and FIG. 4 is a view illustrating a pattern patterned on a metamaterial for an electromagnetic wave filter according to another embodiment of the present invention.

In the metamaterials illustrated in FIGS. 3 and 4, an angle at which rectangle-shaped slots included in the metamaterial may be determined such that a transmission rate thereof based on polarization of an electromagnetic wave incident on the film 211 is controlled, that is the transmission rate and a reflectivity according to the polarization of the electromagnetic wave incident on the film 211 have predetermined values based on rotation of the film 211.

In one embodiment, referring to FIG. 3, the rectangle-shaped slots may be formed in a honeycomb structure pattern including slots arranged at angles ø of 0°, 120°, and 240° with respect to a vertical direction. In another embodiment, referring to FIG. 4, the rectangle-shaped slots may be formed in a pattern of a chloroplast molecular structure including slots arranged in pentagonal and hexagonal shapes which are arranged at specific angles.

Preferably, all of the patterns illustrated in FIGS. 3 and 4 are rotationally symmetric patterns, and various rotationally symmetric patterns other than the examples of the patterns illustrated in FIGS. 3 and 4 may be applied to the metamaterial according to the present invention. Here, in a case in which the slots are pattered in an intaglio shape, slot holes may be formed in the film 211 formed on the substrate 212, and in a case in which the film 221 is embossed and patterned to be a structure type film, the structure type film 221 may be arranged on the substrate 222.

More specifically, a transmission rate of a metamaterial including a single rectangle-shape slot varies on the basis of $T(\theta)=T(0)\cos^2\theta$ according to Malus' law, and when the rectangle-shaped slots are patterned in a rotationally symmetric pattern like the metamaterial of the present invention, that is, when the rectangle-shaped slots are equally arranged by dividing 360° into n parts, a transmission rate of an $m^{th}$ rectangle-shaped slot in an array is determined by the following Equation 1.

$$T(\theta) = T\left(\frac{2\pi}{n}m\right) = T(0)\cos^2\left[\frac{2\pi}{n}m\right] \quad \text{[Equation 1]}$$

Here, $T(\theta)$ is a transmission rate when an angle between a slot and an incident polarization is $\theta$, n is a number by which 360° is divided, and m is an order number of a slot included in a corresponding array when 360° is evenly divided into n parts.

As described above, when a metamaterial is formed such that unit cells, in which rectangle-shaped slots are arranged by evenly dividing 360° into n parts, are repeatedly arranged to form a rotationally symmetric pattern, a transmission rate of each of the unit cells is a sum of transmission rates of the rectangle-shaped slots, and thus the transmission rate of each of the unit cell is expressed in the following Equation 2.

$$T(\theta) = T(0)\sum_{m=0}^{n-1}\cos^2\left[\frac{2\pi}{n}m\right] = T(0)\frac{n}{2} \quad \text{[Equation 2]}$$

That is, since the transmission rate of the metamaterial including the rectangle-shaped slots arranged in the rotationally symmetric pattern is a constant, as shown in Equation 2, the transmission rate according to an angle does not vary.

In addition, a width w of the rectangle-shaped slot may be from several tens of nm to several um, a thickness thereof may be from 100 nm to 1 um, and a length 1 thereof may be several tens of um to several mm, and a metamaterial for a wide band electromagnetic wave filter may be designed by adjusting the width w, the thickness, and the length 1 of the rectangle-shaped slot. That is, the metamaterial may be formed such that the rectangle-shaped slots which pattern the rotationally symmetric pattern according to the present invention may be optimized for a resonance frequency of an object to be detected. More specifically, a resonance frequency of the rectangle-shaped slot is determined by the following Equation 3.

$$f_{res} = \frac{c}{2n_{eff}L} \quad \text{[Equation 3]}$$

Here, c is light speed, L is a length of a slot, and $n_{eff}$ is an effective refractive index and is determined by a material included in a metamaterial. Referring to Equation 3, since a resonance frequency of a rectangle-shaped slot is defined by characteristics of a material included in a metamaterial and the length L of the slot, the length of the rectangle-shaped slot may be adjusted to generate a target resonance frequency. The resonance frequency of the rectangle-shaped slots which pattern the rotationally symmetric pattern according to the present invention may also be determined by adjusting the length of the rectangle-shaped slots which pattern the rotationally symmetric pattern, as described in Equation 2, since rotation of the rectangle-shaped slot does not influence the resonance frequency.

That is, almost all molecules have an inherent mode (for example, rotation, vibration, or intermolecular interaction at a specific frequency) and are widely distributed from an infrared range to a terahertz range, and a basic principle of spectroscopy is to detect an inherent mode of a material using electromagnetic waves having various waves or frequencies. According to the present invention, a metamaterial which resonates independently from a rotation angle at a frequency which matches an inherent mode (for example, a specific wavelength or frequency) of biochemical to be detected may be designed by adjusting a length of rectangle-shaped slots thereof. Then, when spectroscopy is performed using the metamaterial, there is an effect in that a specific molecule may be detected with very high sensitivity and selectivity.

Preferably, since an amplification phenomenon of a strong electromagnetic wave occurs around the slots of the metamaterials illustrated in FIGS. 3 and 4, and, in the honeycomb structure pattern and the chloroplast molecular structure pattern according to the present invention, transmission rates thereof are 7.2 and 5.0 times of a transmission rate of light expected to pass through a region opened by a single slot, and, according to the present invention, an electromagnetic wave which is stronger than a conventional electromagnetic wave may be induced around the slots.

That is, since the patterns formed with the slots illustrated in FIGS. 3 and 4 are formed such that the slots are arranged at different angles, a decrease in transmission rate which may occur at the slots according to polarization directions of incident electromagnetic waves are compensated for between the slots, and transmission rates and reflectivities of the entire metamaterials are constant with respect to the polarization directions of the electromagnetic waves and rotation of the metamaterials.

The above description with reference to FIGS. 3 and 4 pertains to the case in which the rectangle-shaped slots patterned in an intaglio shape are formed in the film 211, as illustrated in FIG. 2A, and the same description may also be applied to the case in which rectangle-shaped structures are embossed and patterned on the film 221, as illustrated in FIG. 2B.

Figure 5A:
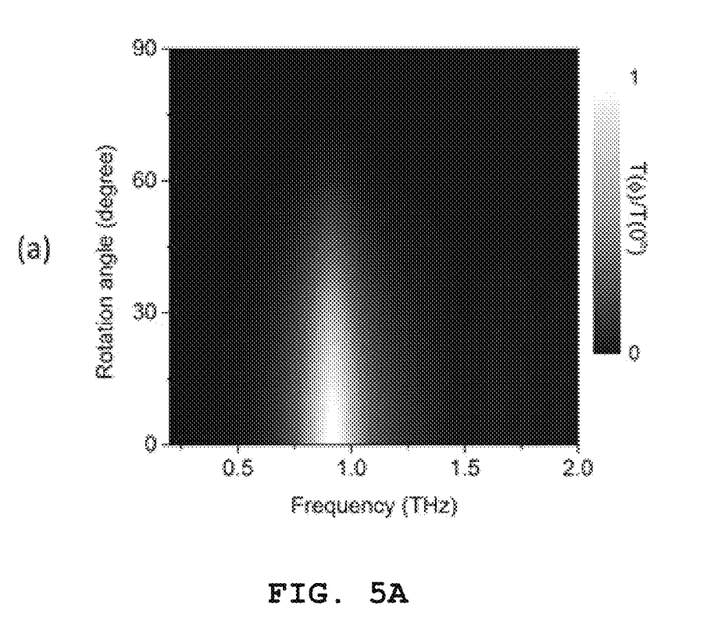
FIGS. 5a and 5b are pictures showing a transmission spectrum of an electromagnetic wave according to a rotation angle of an electromagnetic wave filter formed of a metamaterial.
Figure 5B:
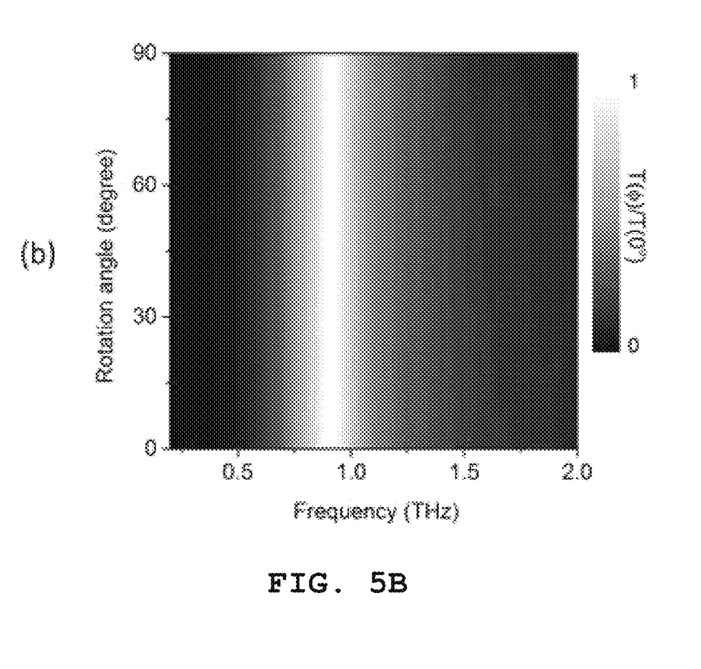
Figure 6:
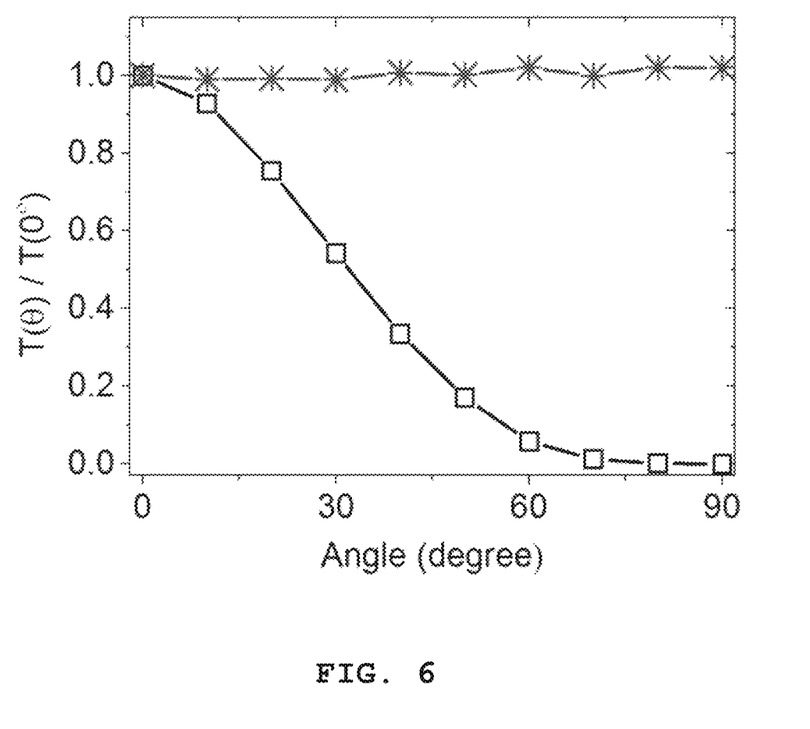
FIG. 6 is a graph showing a change in transmission efficiency of the electromagnetic wave according to the rotation angle of the electromagnetic wave filter formed of the metamaterial.

FIG. 5 is pictures showing a transmission spectrum of an electromagnetic wave according to a rotation angle of an electromagnetic wave filter formed of a metamaterial, and FIG. 6 is a graph showing a change in transmission efficiency of the electromagnetic wave according to the rotation angle of the electromagnetic wave filter formed of the metamaterial.

In a case in which an electromagnetic wave of about 0.8 THz is incident on a metamaterial including slots (or structures) arranged in a single direction or a single slot (or structure), a transmission spectrum of an electromagnetic wave filter based on the metamaterial is shown in FIG. 5A. Referring to FIG. 5A and the black rectangles denoted on the graph illustrated in FIG. 6, it may be seen that when a rotation angle of a slot (or structure), that is the metamaterial, is 0°, the transmission rate of the electromagnetic wave filter based on the metamaterial including the slots (or structures) arranged in the single direction or the single slot (or structure) is very high, but the transmission rate thereof gradually decreases as the rotation angle of the metamaterial increases to 30° and 60°, and when the transmission rate thereof is 90°, the transmission rate is zero. Here, when the rotation angle is 0°, the angle is set to be an angle at which the transmission rate of the metamaterial including the single slot (or structure) is maximized. For example, the rotation angle is set to 0° in a case in which the slot has a vertically long shape and light linearly polarized and perpendicular to a length direction of the slot is incident thereon, and the rotation angle is set to 0° in a case of in which the structure has a vertically long shape and linear light parallel to a length direction of the structure is incident thereon.

In a case in which an electromagnetic wave of 0.8 is incident on a metamaterial including the set of the slots (or structures) arranged in the rotationally symmetric pattern according to the present invention, a transmission spectrum of an electromagnetic wave filter based on the metamaterial is shown in FIG. 5B. Referring to FIG. 5B and red asterisks denoted on the graph, it may be seen that the transmission rate of the electromagnetic wave filter based on the metamaterial including the set of the slots (or structures) arranged in the rotationally symmetric pattern is constantly maintained even when a rotation angle of the slots (structures), that is a rotation angle of the metamaterial, varies among 0°, 30°, 60°, 90°, and the like.

That is, while the transmission rate of the electromagnetic wave filter based on the metamaterial including the slots (or structures) arranged in the single direction or the single slot (or structure) varies sharply according to the rotation angle of the metamaterial, there is an effect in that the transmission rate of the electromagnetic wave filter based on the metamaterial according to the present invention, that is, the metamaterial including the set of the slots (structures) arranged to pattern the rotationally symmetric pattern, is maintained at a predetermined level without being affected thereby even when the metamaterial rotates.

Accordingly, since the electromagnetic wave filter using the metamaterial according to the present invention has a structure including the rotationally symmetrically arranged slots (structures) of the metamaterial, a characteristic of constant transmission or a reflective operation may be implemented by mutual compensation of the slots (structures), and since characteristics of rotation and incident polarization of the metamaterial are suppressed, errors which may occur when the metamaterial of the electromagnetic wave filter is used can be removed.

As described above, there are effects in that a metamaterial can be used for highly sensitive sensing using amplification of an electromagnetic wave locally induced around slots of the metamaterial included in a electromagnetic wave filter, and usefulness in detecting a trace amount of material can be maximized by suppressing a change in transmission efficiency of the electromagnetic wave according to a rotation angle of the metamaterial and minimizing an error which may occur during an experiment or measurement using the electromagnetic wave filter.

In addition, since frequency characteristics can vary within a wide range and an amplification rate of an electromagnetic wave can be adjusted according to a width of a slot by adjusting a length of the slot included in a metamaterial in a range of nanometers to micrometers, there is an effect in that the metamaterial can be variously applied to an object oriented design. Particularly, when compared to conventional spectroscopic analysis, since sensitivity can be increased to a high level due to a phenomenon of an increase in a quantum mechanical absorption cross section induced by amplifying the electromagnetic wave, there is an effect in that the metamaterial can be applied as an element for detecting and analyzing a trace amount of material by slots optimized to a resonance frequency of an object to be detected.

In addition, in a sensing chip which is highly sensitive and senses a trace amount of materials and is operated on the basis of an amplification effect of a strong electromagnetic wave generated by a structure of slots arranged in a single direction, since only a change in a characteristic of a measurement sample can be accurately optically detected by preventing a measurement error which is one weak point of a conventional structure, there is an effect in which the metamaterial can be applied to various fields.

While the exemplary embodiment of a metamaterial for an electromagnetic wave filter according to the present invention has been described, the present invention is not limited thereto and may be variously modified and made within appended claims, the detailed description, and the accompanying drawings, and such modifications are also included in the present invention.

REFERENCE NUMERALS

210 and 220: METAMATERIAL
211 and 221: FILM
212 and 222: SUBSTRATE

What is claimed is:

1. A metamaterial for an electromagnetic wave filter, the metamaterial comprising:
   a substrate; and
   a film disposed on the substrate and having a set of slots arranged to form a rotationally symmetric pattern, which is patterned in an intaglio shape, or a set of structures arranged to form a rotationally symmetric pattern, which is patterned in an embossed shape, to control a transmission rate according to polarization of an electromagnetic wave incident on the film,
   wherein the set of slots or the set of structures have an array angle that is determined such that the transmission rate and a reflectivity thereof have constant values according to the polarization of the electromagnetic wave incident on the film, and
   wherein the set of slots or the set of structures have a chloroplast molecular structure pattern in which the set of slots or the set of structures are arranged in pentagonal and hexagonal shapes.

2. The metamaterial of claim 1, wherein the set of slots or the set of structures have a honeycomb structure pattern in which the set of slots or the set of structures are arranged at 0°, 120°, and 240° with respect to a vertical direction.

3. The metamaterial of claim 1, wherein the substrate comprises quartz, silicon, sapphire, or glass.

4. The metamaterial of claim 1, wherein the film comprises gold, silver, copper, or aluminum.

* * * * *